Oct. 21, 1941.   W. O. BEYER ET AL   2,259,453
COUPLING UNIT
Filed Dec. 8, 1938   3 Sheets-Sheet 1
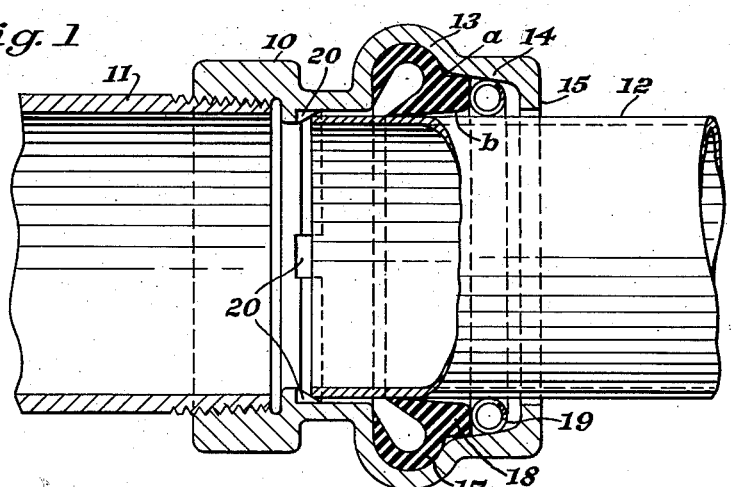
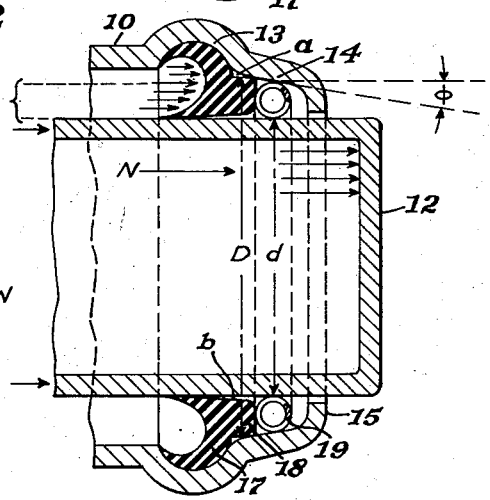
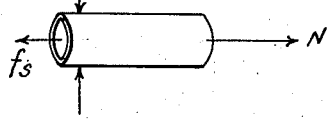
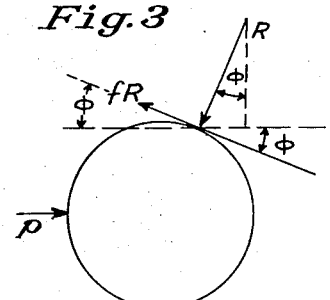
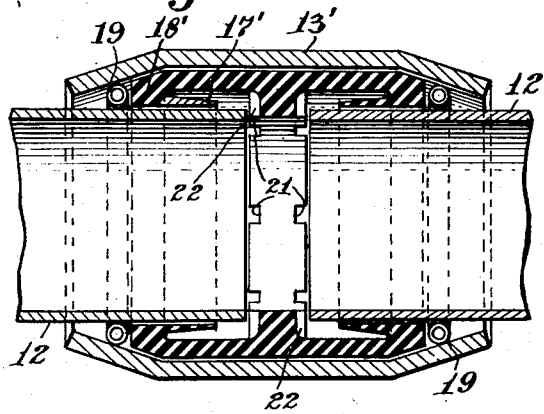

Patented Oct. 21, 1941

2,259,453

UNITED STATES PATENT OFFICE 2,259,453

COUPLING UNIT

Walter O. Beyer and Thomas R. Tarn,
Pittsburgh, Pa.

Application December 8, 1938, Serial No. 244,602

15 Claims. (Cl. 285—163)

This invention relates to a coupling device or connector for holding end portions of fluid conduit or pipe members with a force that varies in accordance with line pressure of a fluid carried by such members.

In another aspect, the invention deals with the provision of a coupling that will also permit angular movement between a pipe member being held and the coupling device without spoiling the gripping action of the coupling or the liquid seal.

In accordance with the principles of the present invention, an end portion of a pipe member adapted to carry a suitable pressure fluid such as oil or water is held with a minimum holding force when line pressure is nil that automatically increases as the fluid pressure increases and also preferably automatically decreases as the fluid pressure decreases. The invention limits the setting up of uncontrollable and uncertain forces, stresses, and strains upon the coupling and the pipe sections, thus permitting the utilization of thin wall tubes based, for example, upon the Barlow formula for bursting pressure.

The combination has a minimum number of operating parts that are constructed and arranged to provide a substantially uniform holding force or gripping action which, as above pointed out, increases and decreases in accordance with variations in the line pressure. As a result, the coupling can be employed to effectively carry fluids under high pressure; also, the pipe sections can be quickly and easily removed with a minimum of effort even for large size installations.

In accordance with our determinations, the slope or inclination of the operating surface is critical from a maximum standpoint. We have set forth herein formulas and graphs for quickly determining the maximum value of the angle as well as the shaped construction or radial thickness of a pressure heel member of the combination. We have determined that an angle of the operating surface which converges in the direction of the force tending to separate the coupling and the pipe member or members being held should not, generally speaking, exceed a maximum value approaching 17°.

Thus, it has been an object of our invention to provide a new and improved form of coupling device for pipe or conduit members adapted to carry fluid under pressure conditions, and to provide one that will conform to the requirements such as herein enumerated.

These and many other objects of our invention will appear to those skilled in the art from the description thereof, the claims, and the drawings.

In the drawings:

Figure 1 is a longitudinal sectional view illustrating an embodiment of our invention;

Figure 1a is a longitudinal sectional view through a connected pair of pipe members showing a modified arrangement of our invention;

Figure 2 is a somewhat diagrammatic view similar to Figure 1;

Figure 3 is a force diagram for one coil of the grip element shown in Figures 1 and 2;

Figure 4 is a force diagram as applied to a section of pipe; and

Figure 5:
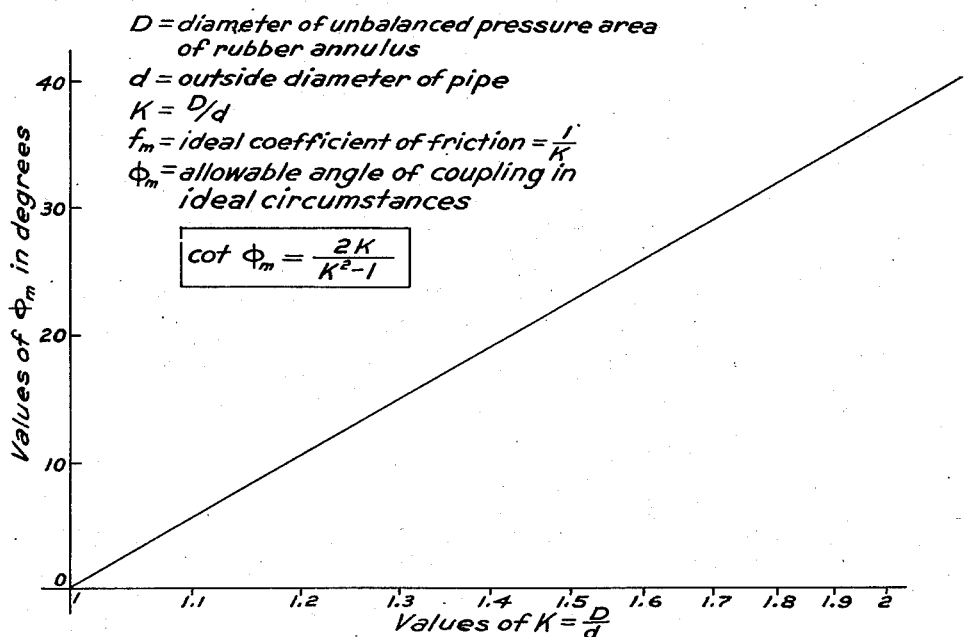
Figure 6:
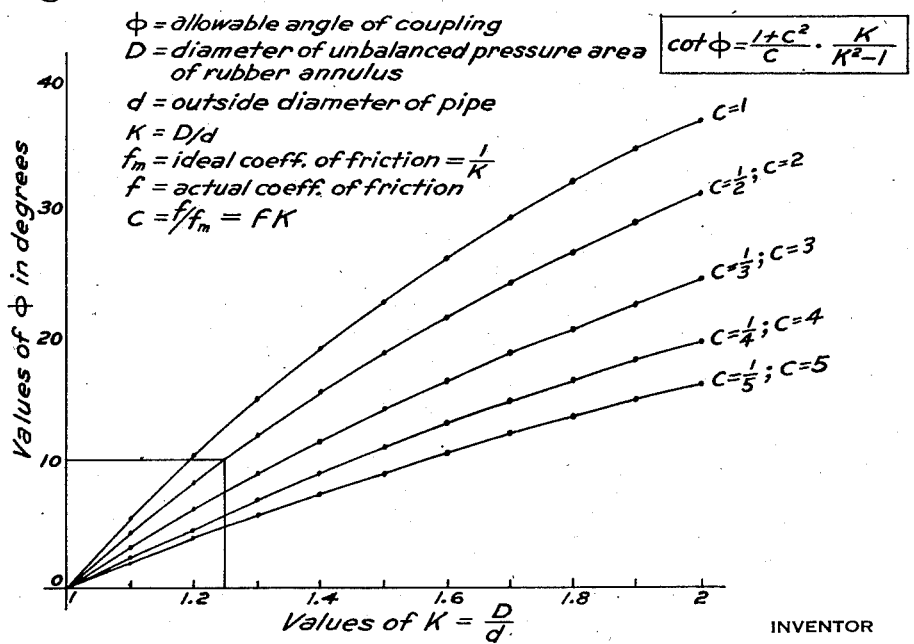
Figure 7:
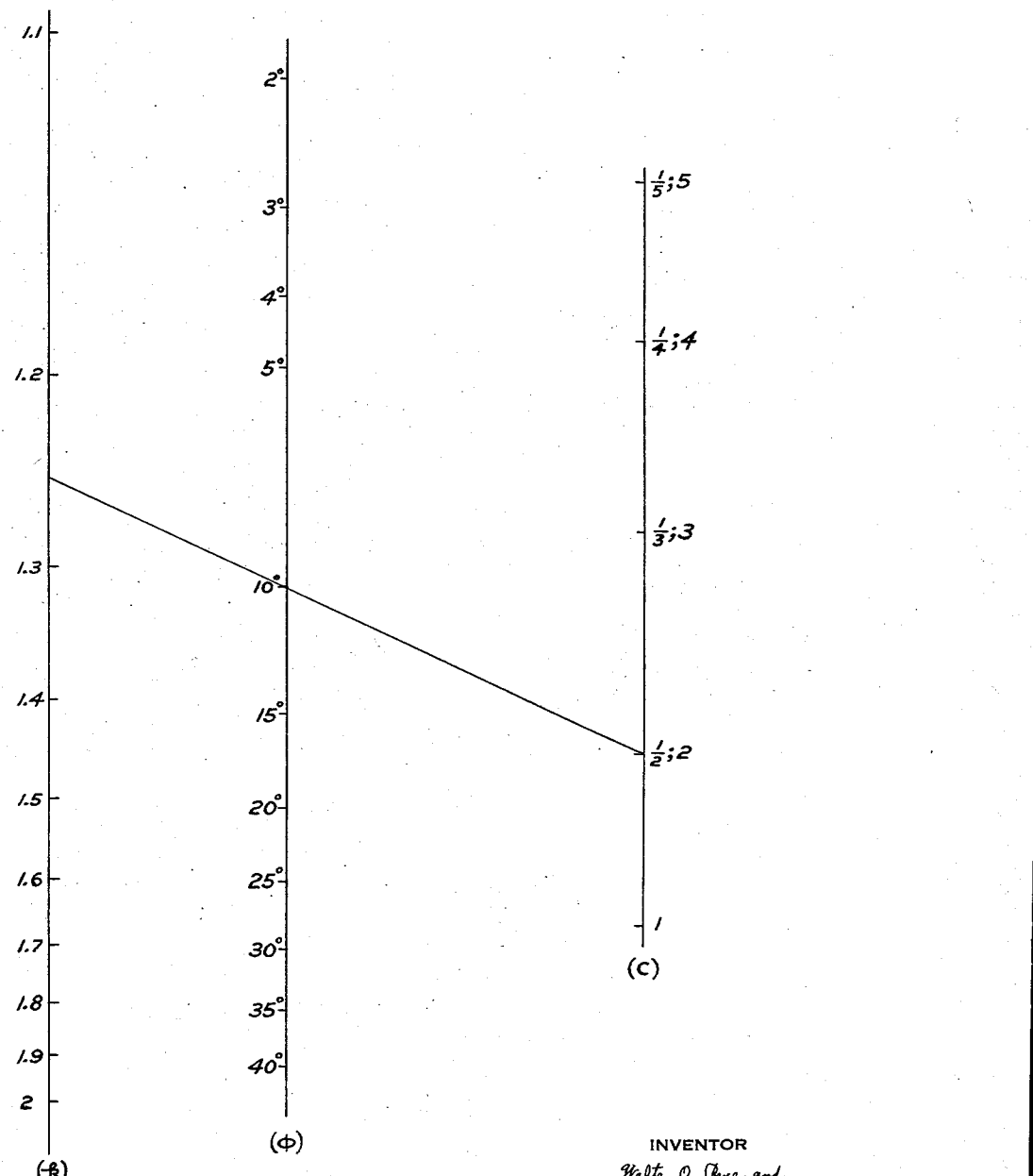

Figures 5, 6, and 7 are charts illustrating and embodying novel discoveries of the present invention.

The present application is a continuation in part of our copending application Serial No. 147,411, filed June 10, 1937, now Patent No. 2,184,376 granted December 26, 1939, and entitled "Coupling devices." It is believed that a full discussion of the theory of the present invention and of the utilization of the various forces will be of help in understanding its nature and scope. In accordance with the present invention, the applicants preferably provide a suitable housing which is adapted to extend over the fluid conduit members that are to be connected together or, more broadly speaking, which is adapted to encircle adjacent ends of fluid conduit members that are to be connected together, or to the coupling, itself. Means or suitable elements are operably mounted with respect to the housing and with respect to at least one of the fluid conduit members in such a manner that the member or members will be held in a suitable connected relationship of a minimum force value where there is no external or internal force acting to separate the conduit members or the connector. By "withdrawing force," the applicants have particular reference to a force or forces, as those exerted by any external agency, such as gravity, an operator, or a machine, or the action thereof, or a strain or stress exerted upon one or both of the fluid conduit member or members, or exerted upon the connector device; it also includes force or forces exerted upon the connector device and upon the conduit member or members by the fluid being carried that is of such a nature that it tends to separate the connected parts, for example, forces set up or caused by temperature changes.

Further, in accordance with the present invention, the applicants provide holding parts for their connector device whose holding effort, pressure, action, or force is proportional to and thus changes with variations in withdrawing or separating forces set up by the fluid being carried. The present device is of such a nature and sensitivity that it will automatically and quickly adjust itself to extreme high and low ranges of pressure or force variations, for example, such as caused by changes in the pressure of the fluid being carried in the conduit members. It is also true that a minimum holding pressure is exerted at the time when it is safe, advisable, and/or expedient to separate the connected members or parts with respect to the connector device. Thus, a minimum of effort will be required to remove the parts from a connected relationship.

The above operative construction is made possible by a new utilization of forces or pressures. In a device illustrating applicants' preferred utilization of forces, a sealing pressure washer is provided for sealing off the fluid between the connector and the conduit member connected thereto, and means is operably associated with the sealing washer to provide a piston action that is proportional to the pressure of the fluid flowing through the conduit and/or through the connector at a particular time. In addition, means is provided that normally grips or holds a particular conduit member in a connected relationship with respect to the connector device with a minimum pressure that automatically increases as a separating or withdrawing effort (external or internal) is exerted; it also automatically decreases its gripping action as the separating or withdrawing effort decreases. Since the major withdrawing effort or force and the one which presents the greatest difficulty is the force or pressure exerted by the fluid, itself, piston means is provided and is constructed and arranged in such a manner that its pressure force is exerted upon the holding means, and the holding means is constructed and arranged in such a manner that variations in pressure or force exerted by the piston means are translated into a holding or resisting force or effort proportional to the force or effort exerted by the piston means, and thus, proportional to the force or pressure of the fluid within the conduit or connector.

In embodying the invention in a practical device, the applicant discovered that there is a maximum or critical angular relationship between the holding means and the parts of the connector cooperatively associated therewith above which a desired translation of fluid forces cannot be effectively accomplished; and, that the angle is the same for other separating forces such as those of a mechanical type, that are for simplicity of description, generally designated externally-applied forces.

The holding or gripping means is constructed and arranged in such a manner that its holding or gripping effort also varies with other forces, such as externally applied forces that would normally tend to separate a connected shaft member or section. The holding effort thus set up is independent of the effort set up by the pressure piston means, in the sense that holding effort of the grip means will be effected by either an external or an internal separating force, or by both.

As shown in Figure 1, we have provided a coupling unit 10 for holding one or more pipe sections or conduits 11 and 12 in a removably-mounted fluid-sealed relationship, regardless of the pressure forces exerted by fluid being carried. The unit 10 has an inner chamber portion within which a sealing ring and pressure translating washer or element 17 and a grip ring or element 19 are operably mounted and held in position with respect to each other. The chamber comprises an annular concave portion 13 for providing a pressure space for the sealing ring and piston element 17, an inclined, sloped or conical portion 14 for operably receiving grip element 19, and an end-limit flange portion 15.

After having determined the desirability of providing a suitable type of coupling unit or device whose holding and/or gripping action, force or forces would, in effect, vary with the actual separating forces, and particularly, the separating forces of the pressure fluid being carried, we found that certain additional problems were presented. In the first place, piston means should be provided transmitting fluid pressure or its effect in such a manner that the grip element or means can suitably utilize the applied forces to increase its holding action. The piston means should be incompressible while at the same time capable of flowing to produce a proportionate pressure or force effect upon the grip element. In this connection, we found that a resilient and flexible material such as rubber would meet the requirements, provided the piston means is capable of free, smooth, and uniform force transmission. A pressure element 17 having a piston means or portion 18, such as shown in Figure 1, successfully meets the problems presented; we preferably provide it with offset portions a and b that are so located that they do not spoil the washer sealing action and at the same time permit the pressure heel of the piston portion 18 to suitably utilize and transmit force energy from the fluid to the grip element 19. A suitable means of a flexibly-deforming nature is preferred to translate pressure fluid force energy into movement-producing energy.

In the modified arrangement of Figure 1, we have employed a somewhat shell-like housing member 13' having a substantially planar central portion terminating in downwardly inclined sloped or tapered end portions. A sealing gasket or pressure element 17' is shaped so that it is slightly larger in diameter than the inside of the housing 13' in order that it will tightly fit therein. The washer is preferably constructed of some suitable resilient material such as rubber and is provided with a substantially centrally located inwardly-projecting shoulder or flange annulus portion that serves as an abutment for the inner ends or edges of the pipe members 12 that are positioned within the connector device. Suitable spaced-apart openings or channelways 21 are provided adjacent each side of the shoulder annulus and open on each side of such annulus into pressure chambers 22. The washer or sealing ring and pressure member 17', in effect, constitute an auxiliary housing and the central shoulder portion divides it into two substantially similar parts.

In the second place, the grip element should have certain characteristics; in this connection, an ordinary solid wedge was found to be impractical in that the holding force of a solid wedge is substantially the same once it is in position and will be substantially the same regardless of whether or not the withdrawing force is increased or decreased. By withdrawing force, we include particular reference to the separating forces exerted by the pressure fluid in the fluid conduit being coupled, as well as any other separating forces, regardless of their nature or cause. The grip element should be of a dynamic or kinetic type that will automatically increase its holding action as pressure is transmitted thereto; in other words, it should be of a type that will translate, either of, itself, or in combination with other elements, various types of withdrawing pressures and/or forces in such a manner as to automatically increase and decrease its holding or grip action in proportion thereto. In this connection, we prefer a flexible or resilient grip element having certain novel characteristics heretofore explained in our copending application Serial No. 147,411. As shown in the drawings, operating surface portions of the housing member 10 and of the pipe member 12 define a space that converges longitudinally of such members in the direction of the force tending to separate them. The gripping means, which includes the elements 17 and 19, are operably disposed in this space in such a manner that the portion 18, which forces the flexible or resilient portions 19 into wedging engagement between the coupling and the pipe member, is so constructed, positioned, or proportioned relative to the spacing that it will be free to move longitudinally thereof to effect such a desired result.

We discovered further that there were other important factors involved in a practical solution to the problems presented, and in this connection, that the angle $\phi$, see diagrammatic Figures 2 and 3, that is formed by the conical, inside-sloped, grip-element-operating surface 14 of the housing of the device 10 is of importance in obtaining the desired holding and grip action as well as a suitable transmission and translation of the forces involved. After extensive experimentation, both by analytical and experimental methods, it was discovered that the angle $\phi$ is critical with respect to maximum angularity and that certain factors enter into its value for various sizes of conduits, shafts, etc. It is important to note at this point that our discoveries bear out the fact that the holding or grip action of the device is substantially independent of the value of the separating or withdrawing forces, provided certain other factors are carefully controlled.

For the purpose of illustrating this particular phase of our invention, we will refer particularly to Figures 2, 3, and 4 of the drawings.

In the force diagram of Figure 3, the representations are as follows:

P=internal pressure action or reaction on grip ring coil or element 19.
R=coupling shell or housing reaction normal to the grip ring coil 19.
S=tubing or pipe reaction normal to grip ring coil.
$f$=coefficient of friction.
$\phi$=angle of slope of surface 14.
P, R, and S are concurrent forces in a plane.
$fR$=frictional force at R contact.
$fS$=frictional force at S contact.

Referring to Figures 2 and 4:

N=internal pressure reaction upon the member of conduit 12.
D=the outer diameter of pressure ring heel 18.
$d$=inner diameter of pressure ring heel, and thus, the outer diameter of the pipe section 12.
$p$=the unit pressure.

Developing equations for equilibrium of each coil of the spring grip element or assembly 19:

(1) $\quad P + fS - fR \cos\phi - R \sin\phi = 0$
(2) $\quad S + fR \sin\phi - R \cos\phi = 0$ Solving these equations for S in terms of $\phi$:

(3) $\quad S = P\left(\dfrac{\cos\phi - f \sin\phi}{(1+f^2)\sin\phi}\right)$

Referring particularly to Figure 4:

(4) $\quad fS \geq N$

Substituting the value of S of Equation 3, we have the following equation:

(5) $\quad fP\left(\dfrac{\cos\phi - f \sin\phi}{(1+f^2)\sin\phi}\right) \geq N$ Solving further:

(6) $\quad \cot\phi \geq \dfrac{N}{P} \times \dfrac{1+f^2}{f} + f$ (7) $\quad \dfrac{N}{P} = \dfrac{.7854 d^2 p}{(.7854 D^2 - .7854 d^2)p} = \dfrac{d^2}{D^2 - d^2} = \dfrac{1}{\left(\dfrac{D}{d}\right)^2 - 1}$ Applying as an example the above formulas to a 3" coupling and a 4" heel:

$$\dfrac{N}{P} = \dfrac{9}{7}$$

Therefore:

$$\cot\phi \geq \dfrac{9}{7}\left(f + \dfrac{1}{f}\right) + f$$

Solving for different values of $f$ between .2 and .75 gives values of $\phi$ from 8°10′ to 16°15′. A coefficient of friction of 1 gives an angle of $\phi$ of 15°30′; thus, it will appear that 16°15′ is substantially the maximum allowable value of $\phi$ for a 3" coupling for any value of coefficient of friction.

To determine the value of friction that will allow the angle $\phi$ to be as large as possible, it is only necessary to maximize the function:

$$\cot\phi = \dfrac{N}{P}\left(f + \dfrac{1}{f}\right) + f$$

In this connection, it should be noted that $d_r$ refers to the derivative and not to the diameter.

(9) $\quad \dfrac{d_r(\cot\phi)}{d_r f} = \dfrac{N}{P}\left(1 - \dfrac{1}{f^2}\right) + 1$ Which gives:

$$\dfrac{N}{P}\left(1 - \dfrac{1}{f^2}\right) + 1 = 0$$

Solving:

(10) $\quad f = \dfrac{d}{D}$ where $d$ denotes the diameter of pipe and of the inner portion of the pressure heel and D denotes the outer diameter of the pressure ring heel 18.

In general, $$\cot\phi \geq \dfrac{N}{P}\left(f + \dfrac{1}{f}\right) + f \text{ and } \dfrac{N}{P} = \dfrac{d^2}{D^2 - d^2}$$

Thus:

(11) $\quad \cot\phi \geq \dfrac{d^2}{D^2 - d^2}\left(f + \dfrac{1}{f}\right) + f$ The maximum allowable angle denoted $\phi m$ for all values of $f$ occurs when $$f = \dfrac{d}{D}$$

In this case:

(12) $\quad \cot\phi m = \dfrac{d^2}{D^2 - d^2}\left(\dfrac{d}{D} + \dfrac{D}{d}\right) + \dfrac{d}{D}$ Solving:

(13) $\quad \cot\phi m = \dfrac{2Dd}{D^2 - d^2}$

For a 3" coupling in which $d=3"$ and $D=4"$, $\cot \phi m = 24/7$ and $\phi$ maximum = 16° 15'.

This result means that regardless of what the coefficient of friction is, the pipe will not stay in the coupling if $\phi$ maximum exceeds 16°15'. In general, it is advisable to allow a smaller value of $\phi$; thus, trouble from small errors of calculation will be avoided.

As a further example, assuming that a 4" coupling ($d=4"$) is employed and $D=5\frac{1}{8}"$, the angle $\phi$ must not exceed 12°45'.

We have developed mathematically a number of methods for readily calculating or determining desired values of $\phi$, $d$, $D$, and $f$. In this connection, referring particularly to the diagram of Figure 5, it will be first assumed that:

$$K = \frac{D}{d}$$

Thus:

$$\frac{N}{P} = \frac{1}{K^2 - 1}$$

and

(13) $$\cot \phi = \frac{1}{K^2-1}\left(f + \frac{1}{f}\right) + f$$

Solving:

(14) $$\cot \phi = \frac{1 + f^2 K^2}{f(K^2 - 1)}$$

Solving Formula 14 for different values of $D$ and a constant value of $d$, we find that the permissible angle $\phi$ in general increases with an increase of $D$ provided the coefficient of friction is also maintained at substantially the same value.

For a maximum value of $\phi$, we must have $\cot \phi$ at a minimum, and considering a fixed value of $K$ and examining the value of $f$ which will allow $\phi$ to be a maximum:

(15) $$\frac{d_r(\cot \phi)}{d_r f} = \frac{1}{K^2 - 1}\left(-\frac{1}{f^2} + K^2\right)$$

When $$K^2 - \frac{1}{f^2} = 0;$$

(16) $$f = \frac{1}{K}$$

Let $fm$ denote the critical value of the coefficient of friction which for a fixed value of $K$ allows the angle $\phi$ to be a maximum and denote this maximum angle $\phi$ as $\phi m$, we thus have:

(17) $$fm = \frac{1}{K}$$

(17a) $$\cot \phi m = \frac{2K}{K^2 - 1}$$

To construct a chart that will graphically portray the variation of $\phi m$ with various values of $K$, proceed as follows:

Let $$K = \tan \psi$$

Then, $$\frac{2K}{K^2 - 1} = \frac{2 \tan \psi}{\tan^2 \psi - 1} = -\frac{2 \tan \psi}{1 - \tan^2 \psi} = -\tan 2\psi$$

Therefore:

$$\cot \phi m = -\tan 2\psi = \cot\left(2\psi - \frac{\pi}{2}\right)$$

from which follows:

(18) $$\phi m = 2\psi - \frac{\pi}{2}$$

For the proper choice of scales on the two axes, this relation can be graphed as a straight. This has been done in Figure 1. For example, referring to Figure 1, assuming that $d=3$, $D=4$, then $$K = \frac{4}{3}$$

and $\phi m = 16\frac{1}{2}°$, approximately. When $d=4$ and $D=5$ in Figure 1, $\phi m = 12\frac{1}{2}°$, approximately, etc. In Figure 1, we have shown a graphical portrayal of maximum angle $\phi m$ obtainable with an ideal coefficient of friction,

(19) $$fm = \frac{1}{K} = \frac{d}{D}$$

In general, this ideal coefficient of friction is not obtainable and we must examine the general situation for a new coefficient of friction $f$. Let it be assumed that $f = cfm$, where $c$ denotes a constant multiplier. In this general case:

(20) $$\cot \phi = \frac{1 + f^2 K^2}{f(K^2 - 1)}$$

Solving:

(21) $$\cot \phi = \frac{1 + c^2}{2c} \times \frac{2K}{K^2 - 1}$$

Hence

(22) $$\cot \phi = \frac{1 + c^2}{2c} \times \cot \phi m$$

This relation shows that $\cot \phi$ is always greater than $\cot \phi m$. Thus, $\phi$ is always less than $\phi m$, except when $c=1$. This follows from the fact that $$\frac{1 + c^2}{2c}$$

is never less than 1.

To construct a chart that will graphically portray the variation of $\phi m$ with both $c$ and $K$ where:

$$K = \frac{D}{d}; \; fm = \frac{1}{K} = \frac{d}{D}; \; c = \frac{f}{fm} = fK = \frac{fD}{D}$$

we proceed as follows:

Let $u$ be defined by the equation $c = \tan u$. Then, $$\frac{1 + c^2}{2c} = \frac{1 + \tan^2 u}{2 \tan^2 u} = \cot 2u$$

Therefore,

(23) $\cot \phi = (\cot 2u)(\cot \phi m)$ $\log \cot \phi = \log \cot 2u + \log \cot \phi m$

The charts

We shall construct two different types of charts to portray the variation of $\phi$ with both $c$ and $K$. The first is a type known as a "Network of curves" chart and the second is known as an "Alignment chart," see Figures 6 and 7, respectively. Each of these types has a value distinction. In utilizing the charts with $d$, $D$, and $f$ known, compute $$K = \frac{D}{d}$$

and $c = fK$; the value of $f$ can be readily obtained experimentally.

In applying the network chart of Figure 6, find a desired value of $K$ on the horizontal axis, project vertically upwardly until the curve with a proper value of $c$ is met, from this point project leftward horizontally and read the value of the throat angle $\phi$ on the vertical axis.

In Figure 7, find the desired value of $K$ on the extreme left axis of the curve, find the desired value of $c$ on the extreme right axis, and join these points with a straight line; then read the value of $\phi$ where this index line crosses the middle axis.

As an example, assume that $D=5$, $d=4$, and $$f = \frac{2}{5}$$

then, $K=1.25$ and $c=.5$.

From Figure 6, starting on the horizontal axis and following the vertical line to obtain a reading in the manner set forth above, $\phi$ is found to be approximately 10°. From Figure 7, upon joining K of 1.25 and $c$ of $$\frac{1}{2}$$

by a straight line, we again obtain a reading $\phi=10°$, approximately. Figure 6 illustrates how $\phi$ varies with K and $c$. That is, $\phi$ increases with K, $\phi$ has a maximum value for $c=1$, and $\phi$ decreases as $c$ varies further from 1 either with $c$ greater than 1 or less than 1.

From the previous discussion including mathematical formulas, charts, etc., it will be apparent that we have solved the problem in a practical manner and have made it possible to provide a practical form of coupling device for various sizes and shapes of fluid conduits. It will also appear that the discussion shows the independence of the design from the standpoint of the actual withdrawing forces exerted by the fluid being carried in the conduit or pipe members that are connected. This, in itself, is believed to be an important phase of the present invention.

Since the coupling device and its associated elements are constructed and arranged to grip the fluid conduit member with a minimum holding force as long as the fluid pressure forces do not increase and as long as other withdrawing forces are not exerted, we are able to remove the conduit members or sections with a minimum of effort when a line is to be dismantled. In irrigation systems and the like, this is desirable in order that a conduit system may be quickly set up and utilized, then disconnected, and transported to a new location.

As set forth in our copending application above-mentioned, a conduit member can be removed from a held or gripped position with respect to the coupling device with a minimum of effort by a simple rotative movement. A safety feature of the device is the fact that a removal is impossible when a pressure fluid is present in conduit members. The twisting action tilts the individual strut members of the grip element 19 in such a manner that they lose their holding effectiveness and permit the coupling and conduit member to be separated with respect to each other. The washer and pressure transmitting element 17 and the grip element 19 are constructed and arranged in such a manner that they will readily stay in position with respect to their associated coupling housing, but can be readily removed and replaced, as desired. The grip element, of course, will have a suitable tensile strength in order that the desired force effects may be accomplished without permanently deforming its normal shape and in order that the forces may be effectively utilized.

Although for the purpose of illustration, we have shown preferred forms and arrangements of our invention, it will be apparent that many modifications, alterations, additions, and subtractions, etc., may be employed without departing from the spirit and scope of the invention as indicated by the appended claims.

We claim:

1. A device for holding a member in position with respect thereto comprising a housing, means operably associated with said housing and with the member for holding the member in position against an axial withdrawing effort, said means having means operably associated therewith and utilizing the withdrawing effort to produce an effective member-holding action, said holding means having an operating surface sloped in the direction of the withdrawing effort, the surface having a slope angle below a determined critical maximum value such that the withdrawing effort may be utilized to effect a proportional member-holding action.

2. A device as defined in claim 1 wherein the member is a fluid conduit, and wherein said second-mentioned means has a portion sensitive to fluid pressure for transmitting the withdrawing effort to said first-mentioned means.

3. A device as defined in claim 1 wherein the member is a fluid conduit, wherein the member and said housing have operating surface portions including said sloped operating surface defining a space converging longitudinally of the member and said housing in a direction of a force tending to separate them, wherein said first-mentioned means has a portion operably contacting said operating surface portions, and wherein said second-mentioned means has a pressure sealing portion sensitive to line pressure and adapted to force said contacting portion into wedging engagement between said operating surface portions.

4. A device for holding a fluid conduit in position with respect to it comprising a housing portion, a resilient element mounted in said housing portion, a grip element mounted in said housing portion in an operative relationship with respect to said resilient element, said resilient element having a pressure heel constructed and arranged to transmit pressure force to said grip element, said housing portion having a conical portion within which said grip element is operably mounted, said grip element being constructed and arranged to abut and hold a fluid conduit member with respect to the housing and to provide a minimum holding action when the pressure of fluid in the conduit is at a low value and to provide an automatically increased holding action when the pressure of fluid in the conduit increases, said conical portion having a slope angle below a determined critical maximum value to insure the defined holding action.

5. A device for detachably holding a longitudinal fluid conduit member in position comprising a housing member, means associated with one of said members and having a sloped portion, an annular grip element operably associated with said sloped portion, said grip element having spaced-apart strut portions and being operably positioned to cooperate with a peripheral surface of the longitudinal member and to hold it in position with respect to said housing, a fluid-pressure-sensitive element operably mounted with respect to the housing member and with respect to said annular grip element, the sloped portion of said means having an angle such that and said fluid-pressure-sensitive element being operably constructed and arranged in such a manner that said grip element will, itself, hold the fluid conduit member in position with a minimum holding action when the pressure of the fluid in the conduit is at a low value and will provide an automatically increasing holding action when the pressure of the fluid in the conduit member increases, said slope angle being below a determined critical maximum value such that the fluid pressure may be utilized to effect a proportional member-holding action.

6. A coupling device for holding an end portion of a pipe member in position therewithin with a force that varies with line pressure of a fluid in the pipe member, comprising a housing adapted to receive the end portion of the pipe member, said housing having an operating surface associated therewith and converging longitudinally of the pipe member in a direction of the force tending to separate the coupling and the pipe member, a substantially continuous contractible gripping element operably contacting said operating surface, a pressure sealing element having a pressure heel operably associated therewith and adapted to be forced by line pressure into operating contact with said gripping element for producing wedging engagement between the coupling and the pipe member, said pressure heel having a shape in a radial direction so proportioned relative to spacing between the pipe member and the coupling that it will be free to move substantially longitudinally of the pipe member being held.

7. A coupling device as defined in claim 6 wherein the angle of convergence of said operating surface is of a value approaching 17° as a maximum.

8. A coupling device for holding an end portion of a pipe member in position therewithin with a force that varies with line pressure of a fluid in the pipe member, comprising a housing adapted to receive the end portion of the pipe member, said housing having an operating surface associated therewith and converging longitudinally of the pipe member in a direction of the force tending to separate the coupling and the pipe member, a substantially continuous contractible gripping element operably contacting said operating surface, a pressure sealing element having a pressure heel operably associated therewith and adapted to be forced by line pressure into an operating association with said gripping element for producing wedging engagement between the coupling and the pipe member, said pressure heel being so constructed and proportioned in a radial direction relative to spacing between the pipe member and the coupling that it will be free to move substantially longitudinally of the pipe member being held and that it will provide sufficient pressure upon the gripping element to effect a positive gripping of the pipe member when line pressure is applied and thus prevent separation of the pipe member from the coupling.

9. A coupling device as defined in claim 8 wherein said pressure heel is of resilient material and wherein a substantially continuous expansible and contractible gripping element is provided.

10. A coupling device for holding an end portion of a pipe member in position therewithin with a force that varies with line pressure of the fluid in the pipe member, comprising a housing adapted to receive the end portion of the pipe member, said housing having an operating surface associated therewith and converging longitudinally of the pipe member in a direction of a force tending to separate the housing and the pipe member, expansible and contractible gripping means operably contacting said operating surface, a pressure sealing element having a pressure heel operably associated therewith and adapted to be forced by line pressure into an operating association with said gripping means for producing wedging engagement between the housing and the pipe member, said pressure heel being so constructed and proportioned relative to spacing between the pipe member and the housing that it will be free to move substantially longitudinally of the pipe member being held to press the gripping means and effect a positive gripping of the pipe member when line pressure is applied and thus prevent separation of the pipe member from the housing.

11. A coupling device for detachably holding a pair of pipe members in position therewithin, comprising a housing having operating surfaces associated therewith and converging at opposite ends longitudinally of the pipe members in a direction of forces tending to separate the housing and the pipe members, a contractible gripping element operably contacting each of said converging end surfaces of said housing, a pressure sealing element interposed between said housing and said pair of pipe members, said element having a pressure chamber and a feather edge adjacent each pipe member, said element having a centrally disposed and inwardly depending shoulder portion for preventing said pipe members from contacting each other within said housing, said pressure sealing element having a pressure heel adjacent each end thereof operably associated therewith, each of said pressure heels being adapted to be forced by line pressure into operating contact with a gripping element for producing wedging engagement between the housing and the pipe members, said pressure heels having a shape so proportioned relative to spacing between the pipe members and the housing that they will be free to move substantially longitudinally of the pipe members being held.

12. A device for holding a fluid conduit member in position comprising a housing, a fluid-pressure-sensitive element operably mounted with respect to the housing, a grip element operably mounted with respect to the housing, and means operably associating said grip element and said fluid-pressure-sensitive element with respect to each other in such a manner that force exerted by fluid pressure in the conduit member being held will be transmitted to said grip element, said housing having a sloped portion cooperatively engaging said grip element, said grip element operatively engaging the fluid conduit member being held, the slope of said engaging portion and the diameter of contacting portions of said grip element being substantially within calculation determinations of the formula:

$$\text{Cotangent } \phi = \frac{2Dd}{D^2 - d^2}$$

wherein, $\phi$ is an angle representing the slope; D and $d$ are, respectively, substantially outer and inner diameters of the contacting portions of said grip element.

13. A device for holding a member in position with respect thereto comprising a housing, means operably associated with said housing and with the member for holding the member in position against an axial withdrawing effort, said means having means operably associated therewith and utilizing the withdrawing effort to produce an effective member-holding action, said holding means having an operating surface sloped in the direction of the withdrawing effort, the surface having a slope angle below a determined critical maximum value such that the withdrawing effort may be utilized to effect a proportional member-holding action, said maximum slope angle of the operating surface being substantially within calculation determinations of the formula:

$$\text{Cotangent } \phi = \frac{2Dd}{D^2 - d^2}$$

wherein, $\phi$ is said slope angle; $D$ and $d$ are, respectively, substantially outer and inner diameters of an operating portion of said holding means.

14. A device for holding a member in position with respect thereto comprising a housing, means operably associated with said housing and with the member for holding the member in position against an axial withdrawing effort, said means having means operably associated therewith and utilizing the withdrawing effort to produce an effective member-holding action, said holding means having an operating surface sloped in the direction of the withdrawing effort, the surface having a slope angle below a determined critical maximum value such that the withdrawing effort may be utilized to effect a proportional member-holding action, said slope angle having a value within maximum limits determined from the following "Network of curves" chart:

$\phi$=allowable angle of coupling (maximum slope)
$D$=diameter of unbalanced pressure area of said holding means (outer diameter)
$d$=outside diameter of the member or substantially inner diameter of said pressure area
$K=D/d$
$fm$=ideal coefficient of friction=

$$\frac{1}{K}$$

$f$=actual coefficient of friction
$c=f/fm=fK$

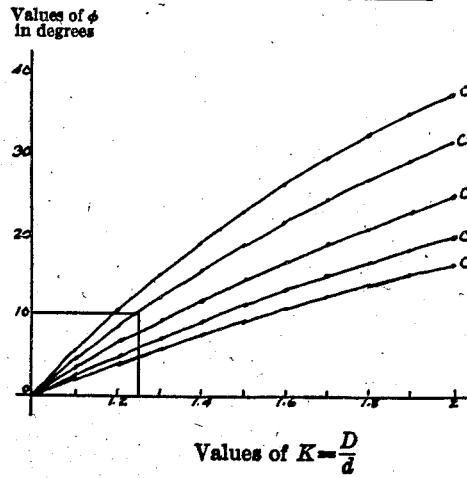

15. A device for holding a member in position with respect thereto comprising a housing, means operably associated with said housing and with the member for holding the member in position against an axial withdrawing effort, said means having means operably associated therewith and utilizing the withdrawing effort to produce an effective member-holding action, said holding means having an operating surface sloped in the direction of the withdrawing effort, the surface having a slope angle below a determined critical maximum value such that the withdrawing effort may be utilized to effect a proportional member-holding action, said slope angle having a value within maximum limits determined from the following "Alignment chart":

$\phi$=allowable angle of coupling (maximum slope)
$D$=diameter of unbalanced pressure area of holding means (outer diameter)
$d$=outside diameter of member or substantially inner diameter of said pressure area
$K=D/d$
$fm$=ideal coefficient of friction=

$$\frac{1}{K}$$

$f$=actual coefficient of friction
$c=f/fm=fK$

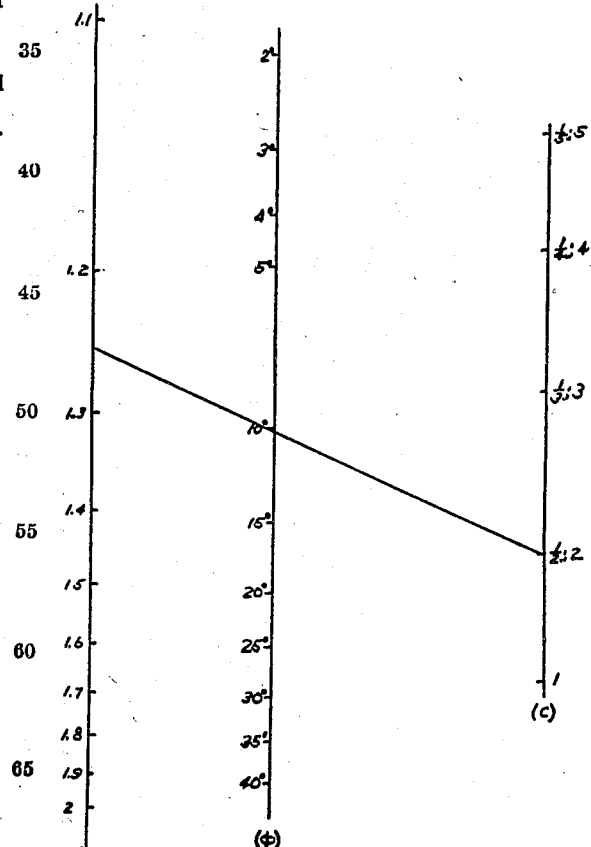

WALTER O. BEYER.
THOMAS R. TARN.